United States Patent Office 3,787,358
Patented Jan. 22, 1974

---

3,787,358
PROCESS FOR PRODUCING POLYPHENYLENE OXIDES
Akinori Nishioka and Shigeo Kawatani, Yokohama, and Mitsuo Ichikawa, Tokyo, Japan, assignors to Japan Synthetic Rubber Company Limited, Tokyo, Japan
No Drawing. Filed Nov. 5, 1971, Ser. No. 196,187
Claims priority, application Japan, Nov. 12, 1970, 45/99,668
Int. Cl. C08g 23/18
U.S. Cl. 260—47 ET
5 Claims

ABSTRACT OF THE DISCLOSURE

A process for producing polyphenylene oxides which comprises reacting a 2,6-disubstituted phenol with oxygen in the presence of cupric sulfide, an amine, and a metallic salt, other than a cuprous salt, which is soluble in said amine.

---

This invention relates to a process for producing polyphenylene oxides, and more specifically to a process for producing such an oxide by reacting a 2,6-disubstituted phenol with oxygen in the presence of a catalyst consisting of cupric sulfide, an amine, and a metallic salt soluble in the amine.

Concerning the manufacture of polyphenylene oxides, some process inventions have already been patented and some catalysts for that purpose reported. For example, the published specification of Japanese patent publication No. 18,692/1961 describes the oxidation of phenols in the presence of a tertiary amine and a cuprous salt which can dissolve in the amine and occur in the form of a bivalent copper. Also, Japanese patent publication No. 29,373/1964 teaches the oxidation of phenols with use of a solution of an amine-basic cupric salt complex as an oxygen-carrying intermediate. In the published specification of the latter patented invention a variety of cuprous and cupric salts suited for preparing amine-basic cupric salt complexes are mentioned by name, but cupric sulfide is recognized as an unsuitable copper compound because it is insoluble in amines and is unable to form any such complex. Cupric sulfide has, in fact, been found insoluble in most of amines and totally incapable of acting as an oxidizing catalyst for phenols. Nevertheless, we have just found that cupric sulfide is soluble in amine solutions of metallic salts and the resulting solutions serve as powerful oxidizing catalysts for phenols. More particularly, it has now been found that the oxidation of a 2,6-disubstituted phenol with the use of a system consisting of cupric sulfide, an amine, and a metallic salt soluble in the amine gives a polymer of a high molecular weight in a good yield. When a dual system composed of a metallic salt excepting a cuprous salt and an amine is used instead of the ternary system of the present invention, no such polymer results.

The present invention, therefore, has for its object to provide a process for producing polyphenylene oxides which comprises reacting a 2,6-disubstituted phenol with oxygen in the presence of a catalyst system consisting of cupric sulfide, an amine, and a metallic salt soluble in the amine.

The disubstituted phenol which can be used to prepare high-molecular polyphenylene oxides in accordance with this invention are the compounds having the general formula

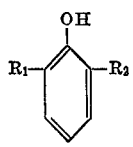

wherein $R_1$ and $R_2$, which may be same or different, are alkyl, aryl or aralkyl groups. Typical examples of the 2,6-disubstituted phenol to be employed in the present invention include 2,6-xylenol (2,6-dimethyl phenol), 2,6-diethyl phenol, 2,6-dipropyl phenol, 2,6-dibutyl phenol, 2,6-diphenyl phenol, 2,6-dibenzyl phenol and the like. From the industrial viewpoint, 2,6-xylenol (2,6-dimethylphenol) is preferred for this purpose because it gives polymers with particularly desirable properties.

In the practice of the present invention, a wide variety of amines may be employed inclduing, for example, primary, secondary, and tertiary aliphatic amines and cyclic amines. Examples of amines to be used in the present invention include primary aliphatic amines such as mono-methyl amine, monoethyl amine, mono-n-propyl amine and mono-n-butyl amine, secondary aliphatic amines such as dimethyl amine, diethyl amine, di-n-propyl amine and di-n-butyl amine, tertiary aliphatic amines such as trimethyl amine, triethyl amine, tri-n-propyl amine and tri-n-butyl amine, cyclic amines such as pyridine, lutidine, picoline and quinoline. Pyridine usually gives the best results.

The amount of an amine which is used in the process of the invention may be varied over a broad range. Generally a very satisfactory result is obtained when the amount of the amine exceeds 0.05 mole per a mole of cupric sulfide.

Useful metallic salts for the practice of the invention are those soluble in amines. Salts such as halides, sulfates, nitrates, carbonates, acetates and butyrates of manganese, cobalt, zinc, cupric copper, ferrous iron, ferric iron, tin, chromium, nickel, and aluminum are suitable. Typical examples of these metallic salts are manganous chloride, manganic chloride, manganous bromide, manganous iodide, manganous carbonate, manganous nitrate, manganous sulfate, manganic sulfate, manganous acetate, manganous butyrate, cobalt chloride, nickel chloride, cobalt bromide, nickel bromide, cobalt iodide, nickel iodide, cobalt nitrate, nickel nitrate, cobalt sulfate, nickel sulfate, cobalt carbonate, nickel carbonate, cobalt acetate, nickel acetate, zinc chloride, zinc bromide, zinc iodide, zinc sulfate, zinc carbonate, zinc nitrate, zinc acetate, cupric chloride, cupric bromide, cupric sulfate, cupric nitrate, cupric acetate, cupric butyrate, ferrous chloride, ferric chloride, ferrous bromide, ferric bromide, ferrous iodide, ferrous carbonate, ferrous nitrate, ferric nitrate, ferrous sulfate, ferric sulfate, stannous chloride, stannic chloride, stannous bromide, stannic bromide, stannous iodide, stannic iodide, chromous chloride, chromic chloride, chromous bromide, chromic bromide, chromous iodide, chromic iodide, chromous sulfate, chromic sulfate, chromic nitrate, aluminum chloride, aluminum bromide, aluminum iodide, aluminum sulfate and aluminum nitrate. Cuprous salts, however, are outside the scope of the present invention. Such a metallic salt can also be varied in an amount over a broad range like an amine. Generally, however, the use of a metallic salt in an amount of from 0.01 to 10 moles per mole of cupric sulfide gives a satisfactory result.

There is no special limitation to the amount of cupric sulfide to be used in the present invention, but usually a good result is obtained when the compound is used in an amount of from 0.001 to 0.1 mole per mole of the 2,6-disubstituted phenol to be used.

The process of the present invention is usually carried out in a solution state. The solvent to be employed is preferably a good solvent for the polymer to be obtained. Above all, benzene, toluene, xylene, monochlorobenzene, dichlorobenzene, nitrobenzene, and other aromatic solvents, halogenated alkanes, dimethyl formamide, etc. are suitable solvents. The amine for the catalytic use may also be adopted as the solvent.

The oxygen to be used in the practice of the invention may be in the form of air as well as pure oxygen.

Desirably the catalyst for the process of the invention is prepared by adding an amine to cupric sulfide and metallic salt and stirring the mixture for several minutes until the cupric sulfide is dissolved completely. The purpose of preparing a polymer would be achieved by adding the phenols and oxidizing the mixture without prior complete dissolution of the catalyst, but in this case the removal of the undissolved catalyst would then be necessary after the completion of the polymerization. It should be noted, however, that, depending upon the proportion of cupric sulfide to be used, the catalytic mixture may have to be employed in a partly undissolved state.

While the reaction temperature to be employed is not critical, usually the present process is carried out within a temperature range between room temperature and 100° C. When necessary, the reaction may be effected at below room temperature.

The present invention will be more fully illustrated by the following examples, which are not restrictive.

EXAMPLE 1

In 50 ml. of pyridine were dissolved 0.48 g. of cupric sulfide and 0.013 g. of manganous chloride, and to the resulting solution were added 6 g. of purified 2,6-xylenol and 50 ml. of chlorobenzene. Oxygen was passed through the mixture for 60 minutes with stirring at 30° C. After the reaction was completed, the solution obtained was poured into a hydrochloric acid-methanol mixture for separation of the polymer. The polymer was taken out by filtration, thoroughly washed with methanol, and dried. In this way 5.8 g. of poly(2,6-dimethylphenylene oxide) was obtained. Its intrinsic viscosity was 0.53 in chloroform at 30° C.

EXAMPLE 2

In 10 ml. of pyridine were dissolved 0.0096 g. of cupric sulfide and 0.0135 g. of cupric chloride, and to the resulting solution were added 6 g. of purified 2,6-xylenol and 50 ml. of chlorobenzene. With stirring at 30° C., the mixture was oxidized for 60 minutes with oxygen. After the reaction, the solution was treated by the procedure described in Example 1, and 5.7 g. of polymer with an intrinsic viscosity of 1.24 was obtained.

EXAMPLE 3

In 25 ml. of pyridine were dissolved 0.048 g. of cupric sulfide and 0.065 g. of cobalt chloride, and then 6 g. of purified 2,6-xylenol and 50 ml. of chlorobenzene were added. Oxygen was passed through the resulting solution with stirring at 30° C. for 120 minutes. The solution gave 4.9 g. of a polymer with an intrinsic viscosity of 0.85.

EXAMPLE 4

The procedure of Example 3 was repeated excepting that the cobalt chloride was replaced by 0.078 g. of zinc chloride. A polymer with an intrinsic viscosity of 0.71 was obtained in a yield of 4.8 g.

EXAMPLE 5

Six grams of 2,6-xylenol, 0.24 g. of cupric sulfide, and 0.06 g. of manganese bromide were dissolved in 60 ml. of toluene containing 40 ml. of pyridine. Oxygen was passed through the mixture for 60 minutes with stirring at 30° C. Following the conclusion of the reaction, the solution was poured into a hydrochloric acid-methanol mixture to separate a polymer therefrom. The product was taken out by filtration, washed with methanol, and dried. A polymer with an intrinsic viscosity of 0.45 was obtained in a yield of 5.1 g.

EXAMPLE 6

In 20 ml. of pyridine were dissolved 0.096 g. of cupric sulfide and 0.098 g. of manganous acetate, and to the resulting solution were added 6 g. of purified 2,6-xylenol and 40 ml. of toluene. Oxygen was passed through the solution with stirring at 30° C. for 90 minutes. After the reaction, 5.7 g. of a polymer was recovered from the reaction solution. Its intrinsic viscosity was 0.74 in chloroform at 30° C.

EXAMPLE 7

In 50 ml. of dimethyl amine were dissolved 0.048 g. of cupric sulfide and 0.20 g. of cobalt chloride, and then 12 g. of purified 2,6-xylenol and 100 ml. of toluene were added. Oxygen was passed through the resulting solution with stirring at 30° C. for 40 minutes. The solution gave 11.5 g. of a polymer with an intrinsic viscosity of 0.41.

Referential Example 1

The procedure of Example 1 was repeated but without manganous chloride, and not a trace of polymer resulted.

Referential Example 2

The procedures of Examples 1 through 4 were repeated without using cupric sulfide. In no case was any polymer obtained.

What is claimed is:

1. A process for producing polyphenylene oxides which comprises reacting a 2,6-disubstituted phenol selected from the group consisting of 2,6-xylenol, 2,6-diethyl phenol, 2,6-dipropyl phenol, 2,6-dibutyl phenol, 2,6-diphenyl phenol, and 2,6-dibenzyl phenol with oxygen in the presence of cupric sulfide, an amine, and a metallic salt, other than a cuprous salt, soluble in said amine.

2. A process according to claim 1 wherein the amine is pyridine.

3. A process according to claim 1 wherein the metallic salt soluble in said amine is at least one member selected from the group consisting of halides, sulfates, nitrates, carbonates, acetates, and butyrates of manganese, cobalt, zinc, cupric copper, ferrous iron, ferric iron, tin, chromium, nickel, and aluminum.

4. A process according to claim 1 wherein the metallic salt soluble in said amine is at least one member selected from the group consisting of manganous chloride, manganic chloride, manganous bromide, manganous iodide, manganous carbonate, manganous nitrate, manganous sulfate, manganic sulfate, manganous acetate, manganous butyrate, cobalt chloride, nickel chloride, cobalt bromide, nickel bromide, cobalt iodide, nickel iodide, cobalt nitrate, nickel nitrate, cobalt sulfate, nickel sulfate, cobalt carbonate, nickel carbonate, cobalt acetate, nickel acetate, zinc chloride, zinc bromide, zinc iodide, zinc sulfate, zinc carbonate, zinc nitrate, zinc acetate, cupric chloride, cupric bromide, cupric sulfate, cupric nitrate, cupric acetate, cupric butyrate, ferrous chloride, ferric chloride, ferrous bromide, ferric bromide, ferrous iodide, ferrous carbonate, ferrous nitrate, ferric nitrate, ferrous sulfate, ferric sulfate, stannous chloride, stannic chloride, stannous bromide, stannic bromide, stannous iodide, stannic iodide, chromous chloride, chromic chloride, chromous bromide, chromic bromide, chromous iodide, chromic iodide, chromous sulfate, chromic sulfate, chromic nitrate, aluminum chloride, aluminum bromide, aluminum iodide, aluminum sulfate, and aluminum nitrate.

5. A process according to claim 1 wherein the 2,6-disubstituted phenol is 2,6-xylenol.

References Cited

FOREIGN PATENTS 28,512  11/1969  Japan.

MELVIN GOLDSTEIN, Primary Examiner